US012481591B2

United States Patent
Hall et al.

(10) Patent No.: US 12,481,591 B2
(45) Date of Patent: *Nov. 25, 2025

(54) PREDICTION CONFIRMATION FOR CACHE SUBSYSTEM

(71) Applicant: Apple Inc., Cupertino, CA (US)

(72) Inventors: Ronald P. Hall, Cedar Park, TX (US); Mary D. Brown, Austin, TX (US); Balaji Kadambi, Austin, TX (US); Mahesh K. Reddy, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,111

(22) Filed: Feb. 9, 2024

(65) Prior Publication Data
US 2024/0176744 A1 May 30, 2024

Related U.S. Application Data (63) Continuation of application No. PCT/US2022/037708, filed on Jul. 20, 2022, which is
(Continued)

(51) Int. Cl.
*G06F 12/00* (2006.01)
*G06F 12/0862* (2016.01)

(52) U.S. Cl.
CPC .. *G06F 12/0862* (2013.01); *G06F 2212/6032* (2013.04)

(58) Field of Classification Search
CPC ......... G06F 12/0862; G06F 2212/6032; G06F 2212/1024; G06F 2212/1028;
(Continued)

(56) References Cited

U.S. PATENT DOCUMENTS 6,189,068 B1 * 2/2001 Witt ..................... G06F 12/0855
711/204
6,581,140 B1 * 6/2003 Sullivan .............. G06F 12/0864
711/204
(Continued)

FOREIGN PATENT DOCUMENTS

CN 104903851 A 9/2015
CN 109815163 A 5/2019
(Continued)

OTHER PUBLICATIONS

Office Action in Chinese Appl. No. 202280054983.X mailed Aug. 29, 2024, 4 pages.
(Continued)

*Primary Examiner* — Shawn X Gu
*Assistant Examiner* — Mohammad S Hasan
(74) *Attorney, Agent, or Firm* — Kowert, Hood, Munyon, Rankin & Goetzel, P.C.; Dean M. Munyon (57) ABSTRACT

A cache subsystem is disclosed. The cache subsystem includes a cache configured to store information in cache lines arranged in a plurality of ways. A requestor circuit generates a request to access a particular cache line in the cache. A prediction circuit is configured to generate a prediction of which of the ways includes the particular cache line. A comparison circuit verifies the prediction by comparing a particular address tag associated with the particular cache line to a cache tag corresponding to a predicted one of the ways. Responsive to determining that the prediction was correct, a confirmation indication is stored indicating the correct prediction. For a subsequent request for the particular cache line, the cache is configured to forego a verification of the prediction that the particular cache line is included in the one of the ways based on the confirmation indication.

20 Claims, 7 Drawing Sheets

Related U.S. Application Data a continuation of application No. 17/397,429, filed on Aug. 9, 2021, now Pat. No. 11,487,667.

(58) Field of Classification Search
CPC ....... G06F 2212/502; G06F 2212/6082; G06F 12/0864; G06F 12/0895; G06F 3/0604; Y02D 10/00

See application file for complete search history.

(56) References Cited

U.S. PATENT DOCUMENTS

| | | | | |
|---|---|---|---|---|
| 6,636,959 | B1* | 10/2003 | Keller | G06F 12/0864 712/210 |
| 7,406,569 | B2 | 7/2008 | van de Waerdt | |
| 2004/0030838 | A1* | 2/2004 | van de Waerdt | G06F 9/3842 712/E9.056 |
| 2004/0215882 | A1* | 10/2004 | Alexander | G06F 12/0864 711/E12.063 |
| 2010/0049912 | A1* | 2/2010 | Mylavarapu | G06F 1/3203 711/E12.083 |
| 2010/0049953 | A1* | 2/2010 | Mylavarapu | G06F 12/0882 712/225 |
| 2012/0284463 | A1 | 11/2012 | Srinivasan et al. | |
| 2014/0201449 | A1 | 7/2014 | Sassone et al. | |
| 2014/0297965 | A1 | 10/2014 | Jayaseelan et al. | |
| 2015/0293853 | A1* | 10/2015 | Yu | G06F 12/0864 711/137 |
| 2016/0335550 | A1 | 11/2016 | Achin et al. | |
| 2019/0042469 | A1 | 2/2019 | Coe et al. | |
| 2021/0240631 | A1 | 8/2021 | Joo | |

FOREIGN PATENT DOCUMENTS

| | | |
|---|---|---|
| KR | 10-2019-0058316 A | 5/2019 |
| TW | 201913385 A | 4/2019 |

OTHER PUBLICATIONS

International Search Report and Written Opinion in PCT Appl. No. PCT/US2022/037708 mailed Nov. 2, 2022, 10 pages.

Office Action in Taiwanese Appl. No. 111129844 mailed Feb. 3, 2023, 4 pages.

Examination Report in Indian Appl. No. 202417007764 mailed Jun. 6, 2025, 6 pages.

* cited by examiner

PREDICTION CONFIRMATION FOR CACHE SUBSYSTEM

The present application is a continuation of PCT App. No. PCT/US22/37708, entitled "PREDICTION CONFIRMATION FOR CACHE SUBSYSTEM," filed Jul. 20, 2022, which claims priority to U.S. application Ser. No. 17/397,429, also entitled "Prediction Confirmation for Cache Subsystem," filed Aug. 9, 2021 (now U.S. Pat. No. 11,487,667); the disclosure of both applications are incorporated by reference herein in their entirety.

BACKGROUND

Technical Field

This disclosure is directed to computer systems, and more particularly, to cache subsystems.

Description of the Related Art

Computer systems employ various types of memory in a memory hierarchy. This hierarchy may extend from architected registers in a processor (e.g., to store operands for instructions to be executed), to bulk storage on, e.g., a hard disk drive or solid state drive. Many computer systems include multiple levels of cache memory as well.

Cache memory is a type of memory that is lower in a memory hierarchy than registers, but higher in the hierarchy than a system memory, such as a random access memory (RAM). A cache may store information based on principles of locality, including temporal locality (e.g., information recently accessed is likely to be accessed again within a given time) and spatial locality (e.g., information recently accessed is likely to be stored near other information that will be accessed). Information stored in a cache based on these principles may be accessed faster than it would otherwise be if only stored in system RAM or bulk storage. Thus, caches may improve the overall performance of computer systems by reducing access times for at least some information (e.g., data or instructions) that is to be used by the processor.

SUMMARY

An apparatus for prediction confirmation in a cache subsystem is disclosed. In one embodiment, a cache subsystem includes a cache configured to store information in cache lines arranged in a plurality of ways. A requestor circuit is configured to generate a request to access a particular cache line in the cache. A prediction circuit is configured to generate a prediction of which one of the plurality of ways of the cache includes the particular cache line. A comparison circuit is configured to verify the prediction by comparing a particular address tag associated with the particular cache line to a cache tag corresponding to a predicted one of the plurality of ways. The prediction circuit is further configured to, in response to the comparison circuit determining that the prediction was correct, store a confirmation indication indicating that the prediction was correct, and wherein, for a subsequent access request for the particular cache line, the cache is configured to forego a verification of the prediction that the particular cache line is included in the one of the plurality of ways based on the confirmation indication indicating that the prediction was correct.

In one embodiment, the verification of the prediction includes the reading of an address tag from an address tag memory. The address tag is provided to the comparator, along with the cache tag. Upon determining that the address tag and the cache tag match, the prediction is confirmed correct, and the prediction circuit indicates the same, which causes the setting of a confirmation bit. The confirmation bit is stored in a confirmation bit memory. For a subsequent request for the correctly-predicted cache line, the confirmation bit memory is queried. Determining that the confirmation bit is set thus results in the cache subsystem forgoing both the read of the cache tag from the cache and the comparison operation. Forgoing the tag read and compare operations may thus result in non-negligible power savings.

BRIEF DESCRIPTION OF THE DRAWINGS

The following detailed description makes reference to the accompanying drawings, which are now briefly described.

DETAILED DESCRIPTION OF EMBODIMENTS

The present disclosure is directed to an apparatus and method for confirming a prediction of a way in a cache subsystem. Way prediction is used in caches to reduce power consumption. Instead of looking for a block/page in all ways for a requested cache line, a prediction can be made as to which particular way the cache line is stored. If the prediction is correct, less power is consumed than would be if all ways were searched.

In making a prediction, an address tag array may be read to obtain an address tag corresponding to the requested cache line. A cache tag corresponding to the predicted way may also be read from the cache. The address tag is then compared with the cache tag corresponding to the predicted way. If the tags match, the way in which the requested cache line is stored has been correctly predicted. However, even when the prediction is correct, the reading of the cache tag and the subsequent compare operation can consume a significant amount of power, even though only a single way is searched rather than all ways of the cache. Furthermore, the prediction may be performed for each subsequent access of the cache line, thereby duplicating the effort of the original correct prediction.

The present disclosure is based on the insight that once a cache line prediction is correct, it will continue to be correct for subsequent accesses of that cache line unless there is a change to the status of the cache line. The possible changes include eviction of the cache line, invalidation of the cache line, a context switch, or a different virtual page is predicted. However, if the cache line remains validly stored in the predicted way, the prediction may also remain valid.

Based on the insight discussed above, a confirm bit may be added for a particular cache line when it is correctly predicted to be stored in a particular way. When a prediction is made for a particular cache line and is verified as being stored in the predicted way, a confirm bit is set and remains so until a change of status occurs, such as one of the examples provided in the previous paragraph. For a subsequent access request for the particular cache line, the confirm bit is read, and the cache subsystem may forego the reading of the cache tag and thus the compare operation. This may result in additional power savings over the scenario in which a cache line is correctly predicted for a number of different accesses. Furthermore, performance gains may be achieved by eliminating those steps needed to confirm the prediction and thus not duplicating the effort of the original prediction. The use of the confirm bit may be particularly useful in certain situations, such as in program loops in which a particular cache line is repeatedly accessed.

It is noted that while the verification of a prediction as discussed herein may include tag read and compare operations, the disclosure is not intended to be limiting in this manner. On the contrary, the disclosure is intended to cover any suitable mechanism for verifying that a cache line is stored in a predicted way of a cache.

The present disclosure will now be discussed in further detail, beginning with a cache subsystem and its operation with regard to predicting a way, confirming the prediction, and operation subsequent to that confirmation. Examples of cache subsystems utilizing the confirm bit mechanism an instruction cache subsystem and a data cache subsystem are then discussed. A description of one embodiment of a memory for storing confirmation bits follows. Flow diagrams illustrating methods of operating a cache subsystem with tag confirm bits are then described. The description closes with a discussion of an example system.

Figure 1:
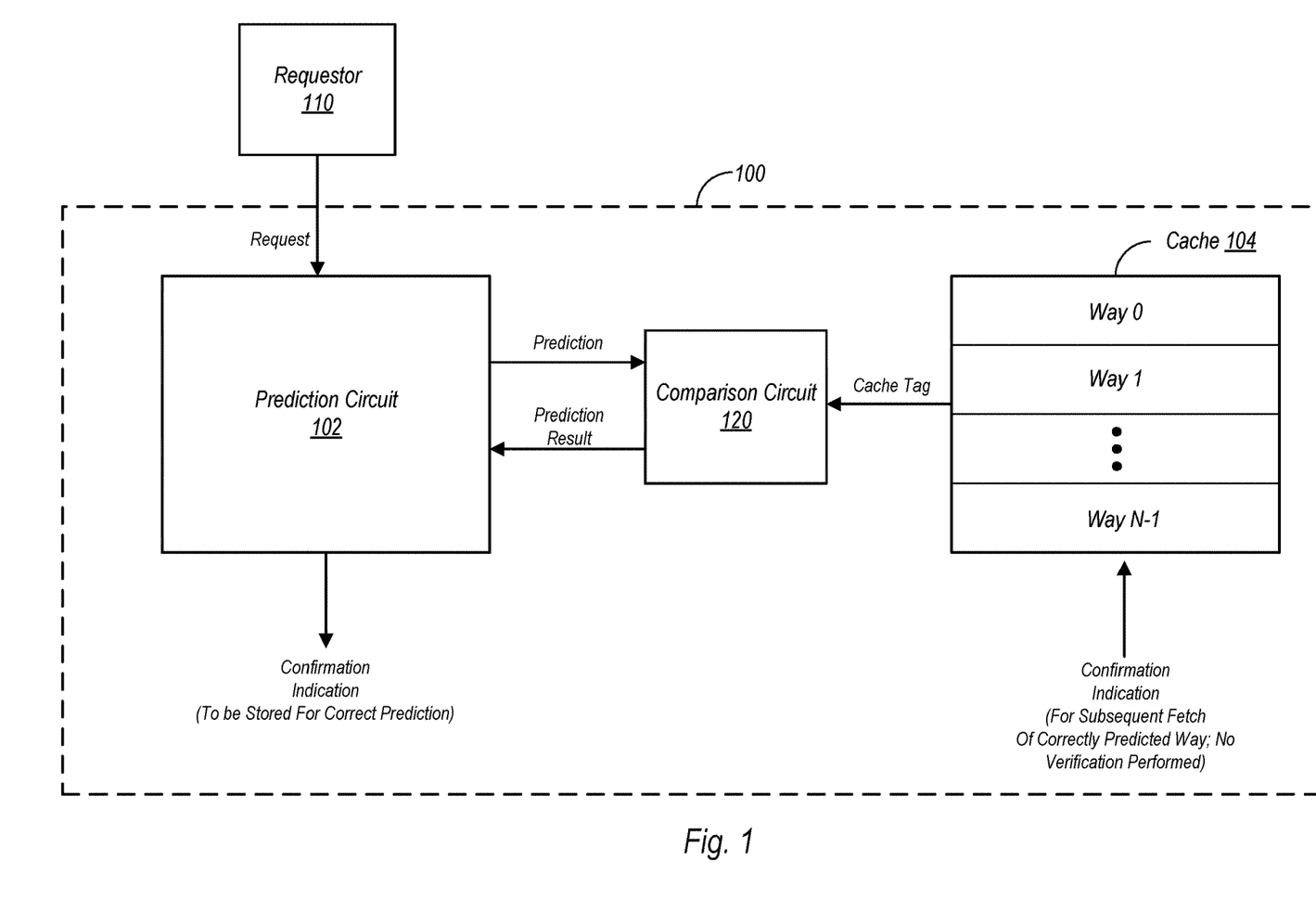
FIG. 1 is a block diagram of one embodiment of a cache subsystem.

Cache Subsystem with Prediction Confirmation:

FIG. 1 is a block diagram of one embodiment of a cache subsystem in which the way of a requested cache line is predicted and, if the prediction is correct, a confirmation bit is set. It is noted that FIG. 1 shows only a portion of a cache subsystem, and additional circuits may be included therein, such as those to be discussed below in reference to FIGS. 2 and 3.

In the embodiment shown, cache subsystem 100 includes a prediction circuit 102, a cache 104, and a comparison circuit 120. Cache 104 in the embodiment shown includes N ways, and is an N-way set associative cache. Embodiments in which cache 104 is fully associative are possible and contemplated as well.

Cache subsystem 100 is configured to receive cache access requests from a requestor 110. The requestor 110 may be one of a number of different types of functional circuit units that may request access to a cache. In one embodiment, cache 104 is an instruction cache configured to store instructions to be executed by a processor. Accordingly, requestor 110 in such an embodiment may be an instruction fetch unit that initiates a cache request in order to fetch instructions. In another embodiment, cache 104 is a data cache, while the requestor 110 may be a processor core or portion thereof that initiates a request for data used in the execution of an instruction. Generally speaking, cache 104 may be either an instruction cache or a data cache, while requestor 110 may be any type of functional circuit that would submit an access request to the corresponding cache type.

Prediction circuit 102 in the embodiment shown is configured to predict a way in which a particular cache line is stored. More particularly, prediction circuit 102 generates a prediction in response to an incoming access request for a predicted cache line. Upon receiving an indication of the requested cache line, prediction circuit 102 generates the prediction and provides the same to comparison circuit 120. In the embodiment shown, an address tag associated with the requested cache line is access by prediction circuit 102 and provided as part of the prediction process.

Comparison circuit 120 may also receive a cache tag that is provided from cache 104 in response to a request for which a prediction is to be verified. The cache tag provided by cache 104 may correspond to the predicted cache way. Upon obtaining both the cache tag and the address tag (from prediction circuit 102), comparison circuit 120 performs a comparison operation. If the address tag matches the cache tag, the prediction is considered to be correct. Otherwise, the prediction is considered incorrect, and additional ways are searched to find the requested cache line, if present in the cache. If the requested cache line is not stored in the cache, it may be accessed from system memory.

In response to correctly predicting that a requested cache line is stored in the particular way, prediction circuit 102 is configured to generate and store a confirmation indication. As will be discussed below, the confirmation indication, or confirmation bit, may be stored in a special memory. For subsequent predictions of the particular cache line, the setting of the confirmation bit provides an indication that a previous prediction of a particular way storing the cache line was correct. Thus, in response to observing the confirmation bit in its set state, cache subsystem 100 may forego certain operations if the cache line associated with the correct prediction is requested again.

If the cache subsystem 100 determines that the confirmation bit has been set in the embodiment shown, no read of the cache tag from cache 104 is conducted. Furthermore, no comparison operation is performed by comparison circuit 120, since no cache tag is provided. Accordingly, for a subsequent request of a cache line that was correctly predicted as stored in a particular way, the cache tag read and compare operations are eliminated. More generally, no verification is performed when a corresponding confirmation bit indicates that the way in which a requested cache line is stored was correctly predicted in a prior access. Eliminating the verification operations may result in significant power savings as well as performance improvements.

When a confirmation bit is set in response to a correct prediction, it may remain set as long as the prediction itself remains valid. The confirmation bit may be reset in response to various events that affect the cache line associated with the correct prediction. For example, if the cache line is invalidated, the confirmation bit is reset. Similarly, the confirmation bit is reset if the cache line is evicted from the cache. A context switch may also cause a resetting of the confirmation bit, as the cache may be flushed. However, as long as the cache line associated with the correct prediction remains stored in the predicted cache line and also remains valid, the confirmation bit may remain in a set state.

Figure 2:
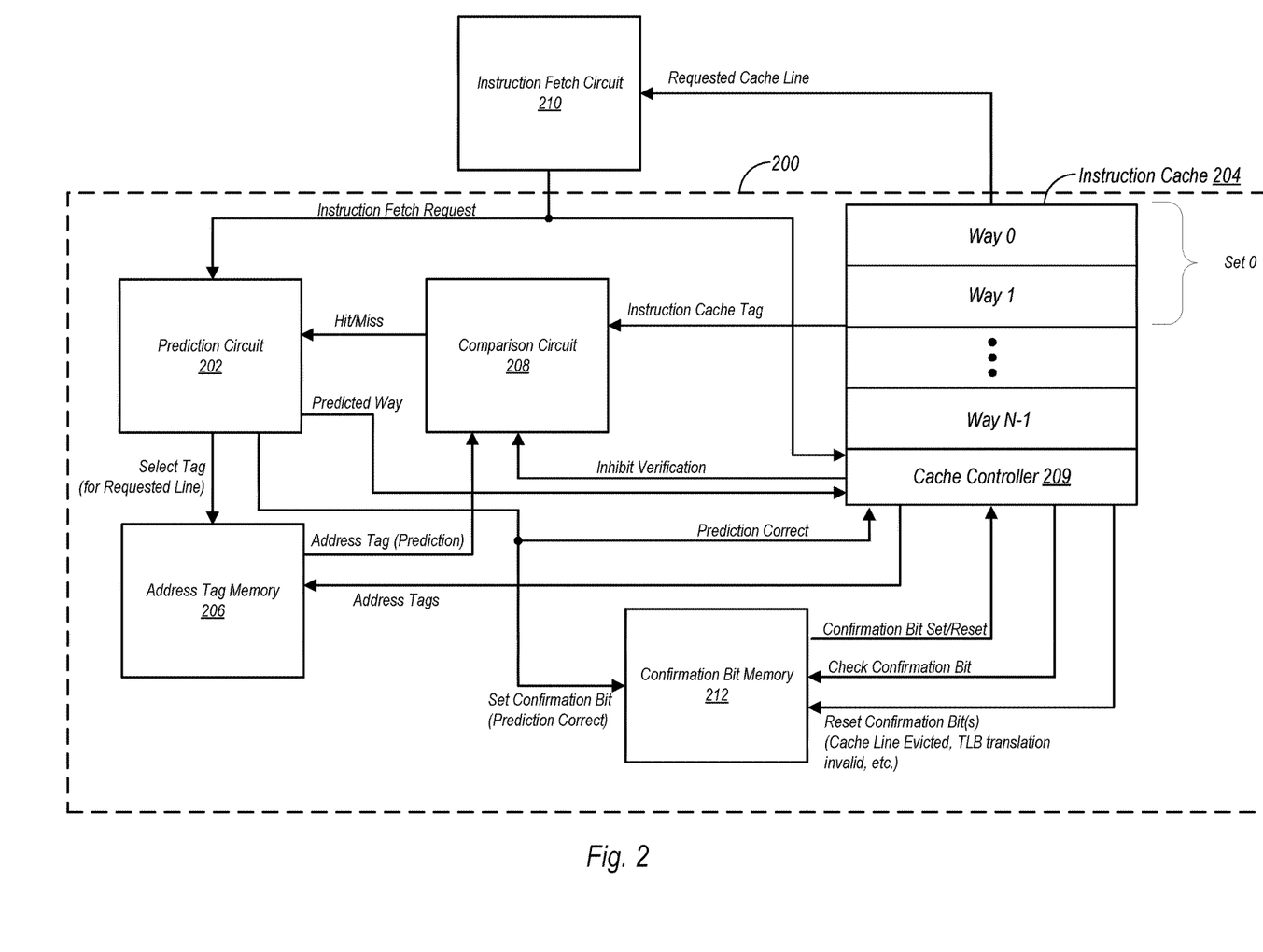
FIG. 2 is a block diagram of one embodiment of a cache subsystem having an instruction cache.

Instruction and Data Cache Subsystems:

FIG. 2 is a block diagram of one embodiment of a cache subsystem implementing an instruction cache. In the embodiment shown, cache subsystem 200 includes an N-way set associative cache, instruction cache 204. The number of ways in each set in this particular embodiment is two, with Way 0 and Way 1 comprising Set 0. Although not explicitly shown, Set 1 would comprise Ways 1 and 2 for this embodiment, and so on. Other embodiments with different arrangements are possible and contemplated. Instruction cache 204 also includes a cache controller 209, which performs various cache control functions. These functions include, but are not limited to, storing cache lines, evicting cache lines, writing cache lines into instruction cache 204, invalidating cache lines, and reading and providing requested cache lines to a requestor.

Instruction cache 204 in the embodiment shown is configured to store instructions that are to be executed by a processor. Accordingly, the requestor in this particular embodiment is instruction fetch unit 210, which requests access to instructions to be executed as part of a program or instruction thread. An instruction fetch request is provided by instruction fetch circuit 210 to both prediction circuit 202 and cache controller 209.

When an instruction fetch request is issued for a cache line, the request is received by both prediction circuit 202 and cache controller 209. Prediction circuit 202 in the embodiment shown may respond to the request by generating a prediction as to a particular way in which the requested cache line is stored in instruction cache 204. Upon generating the prediction, prediction circuit 202 may access address tag memory 206 to obtain an address tag corresponding to the requested cache line. This address tag may then be provided to comparison circuit 208 to be used in a verification operation. The predicted way may also be provided to cache controller 209, which can use this information to determine if the requested cache line was the subject of a previously correct prediction that is still valid.

Address tag memory 206 in the embodiment shown may store virtual addresses, although embodiments in which physical addresses are stored therein are possible and contemplated. Embodiments are also possible and contemplated in which address tag memory 206 stores virtual addresses, while corresponding physical addresses are accessed from a translation lookaside buffer (TLB) and used as a basis for performing the comparison by comparison circuit 208. For the purposes of this disclosure, address tag memory 206 may be considered to store virtual addresses, physical addresses, and/or may also be considered to comprise multiple memories in which virtual addresses are stored in one memory circuit while corresponding physical addresses are stored in another memory circuit (e.g., a TLB as mentioned above). Irrespective of whether the address tag provided is virtual or physical, comparison circuit 208 in the embodiment shown performs the comparison that enables a determination as to whether a way prediction is correct for a requested cache line.

Cache controller 209 in the embodiment shown may initially respond to a request for a cache line by performing a query of the confirmation bit memory 212. In the embodiment shown, confirmation bit memory 212 is configured to store confirmation bits corresponding to cache indexes and corresponding ways in which various cache lines may be stored. Using the information regarding the predicted way and information regarding the requested cache line, cache controller 209 may conduct the query of confirmation bit memory to determine if a confirmation bit has been set in the particular way for the requested cache line.

If the confirmation bit is not set (e.g., confirmation bit reset), thereby indicating that no previously correct prediction for the requested cache line is currently valid, cache controller 209 may respond by providing an instruction cache tag to comparison circuit 208, the instruction cache tag corresponding to the predicted way. In response thereto, comparison circuit 208 compares the address tag received from address tag memory 206 to the instruction tag received from instruction cache 204. If the tags match (a "hit"), comparison circuit 208 provides an indication of the same to prediction circuit 202. In response to receiving the hit indication, prediction circuit 202 provides an indication to confirmation bit memory 212 indicating the correctly predicted way and a corresponding index. The confirmation bit is then set in confirmation bit memory 212 for the predicted way and index. Additionally, an indication of that the prediction was correct is provided to cache controller 209, which may respond by accessing the requested cache line and providing it to instruction fetch circuit 210.

It is noted that embodiments are possible and contemplated in which the functions of prediction circuit 202 and comparison circuit 208 are combined into a single unit. In such embodiments, the comparison circuitry implemented therein may be the source of the indication that a prediction is correct. In the embodiment explicitly illustrated in FIG. 2, it is also possible and contemplated that comparison circuit 208 provides the indication to confirmation bit memory 212 of the correct prediction.

If a prediction is not correct (if the address tag and instruction tag do not match), prediction circuit 202 (or comparison circuit 208) may provide an indication of the same to cache controller 209. In response to the incorrect prediction, cache controller 209 may cause a search of additional ways in cache 204 to determine if the requested cache line is stored therein. If the requested cache line is not stored in any way of instruction cache 204, a search of a main system memory may be performed by a memory controller. If stored in a different way than that which was predicted, the requested cache line is provided to instruction fetch circuit 210.

If a subsequent request for access to a particular cache line that was subject to a previously correct prediction, the verification process is not performed in the embodiment shown. In particular, cache controller 209 may again query confirmation bit memory 212 in response to a request for the particular cache line. Upon receiving from the confirmation bit memory an indication that the confirmation bit is set for the predicted way of the particular cache line, cache controller 209 in the embodiment shown asserts an "Inhibit Verification" signal that is received by comparison circuit 208. This signal, when received by comparison circuit 208, indicates that cache controller 209 will not be reading an instruction tag to be provided for comparison, and thus no comparison operation will be performed for this particular request. By forgoing the read of the instruction tag and the comparison operation, significant power savings may be achieved. Eliminating the tag read and compare operations may also speed up performance. Since the confirmation bit is set, cache controller 209 also responds by providing the particular cache line to instruction fetch circuit 210 from the corresponding way of instruction cache 204, without the delay incurred by waiting to determine a prediction is verified.

Cache controller 209 in the embodiment shown is configured to reset confirmation bits stored in confirmation bit memory 212 in response to certain conditions. For example, if a cache line that was a subject of a previously correct prediction is at some subsequent time determined to be invalid, cache controller 209 may cause a reset of the corresponding confirmation bit. Eviction of a cache line that was previously correctly predicted to be stored in a particular way may also cause a reset of the corresponding confirmation bit. Other conditions for resetting a confirmation bit include invalidation of a corresponding virtual-to-physical address translation, a context switch in which the cache is flushed (thereby resetting all confirmation bits), and so on.

Figure 3:
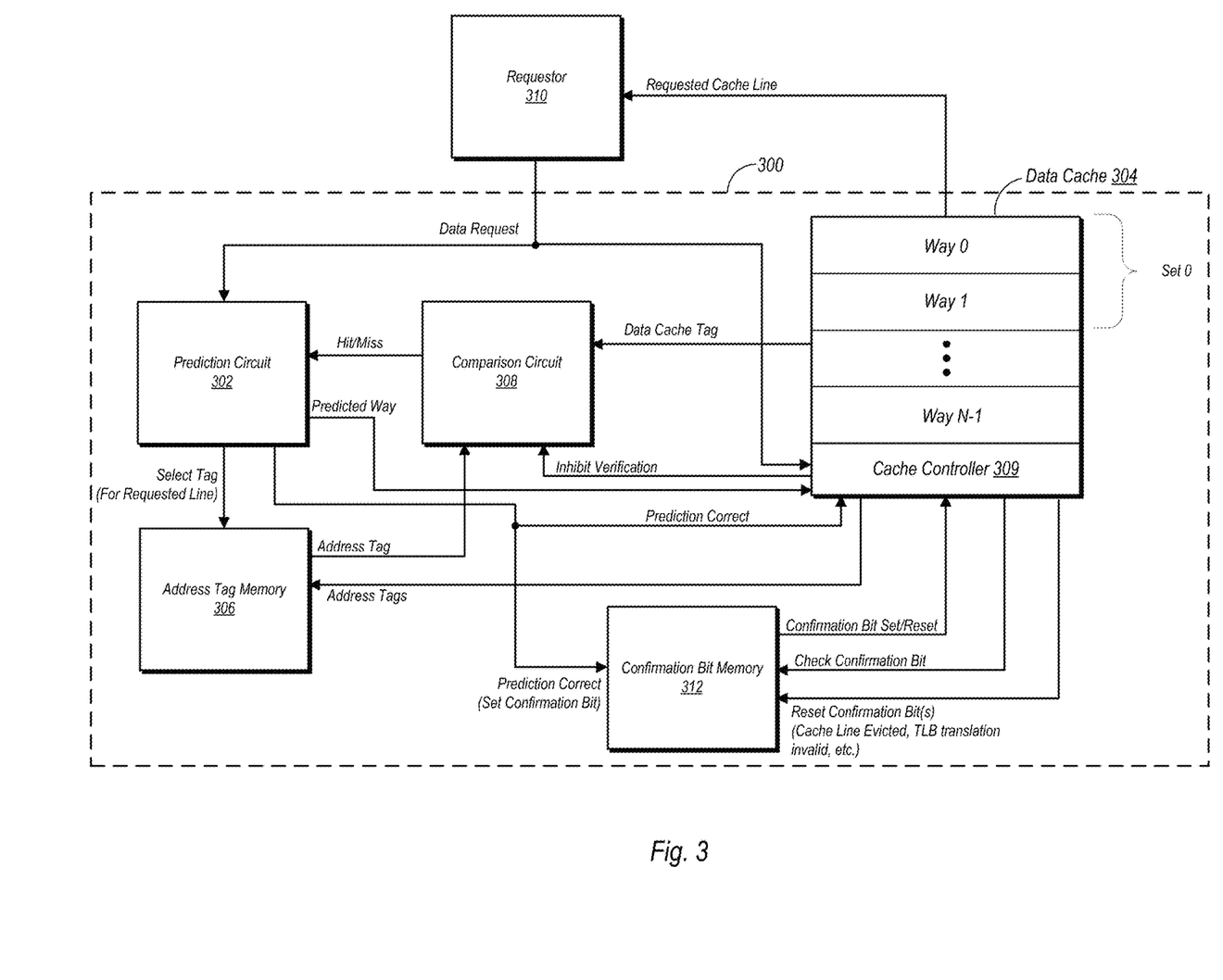
FIG. 3 is a block diagram of one embodiment of a cache subsystem having a data cache.

FIG. 3 is a block diagram of one embodiment of a cache subsystem implementing a data cache. In the embodiment shown, cache subsystem 300 is similar to cache subsystem 200 as shown in FIG. 2, with the primary difference being that cache 304 is a data cache that includes cache controller 309. Requestor 310 in the illustrated embodiment may be, e.g., one of one or more processor cores that utilizes data cache 304. More generally, requestor 310 may be any type of functional circuit capable of accessing and utilizing a data cache. Prediction circuit 302, comparison circuit 308, address tag memory 306, cache controller 309, and confirmation bit memory 312 may largely function in a manner similar to their counterparts shown in FIG. 2. Furthermore, these circuit units may vary from one embodiment to the next in the same manner as those discussed above with regard to cache subsystem 200. In short, cache subsystem 300 and the components thereof in the embodiment shown is configured to make and verify predictions of a particular way that stores a requested cache line of data, set a confirmation bit in response to a correct prediction, and to forego a verification process that includes tag read and compare operations when a confirmation bit indicates that a previous prediction for the requested cache line was correct.

Figure 4:
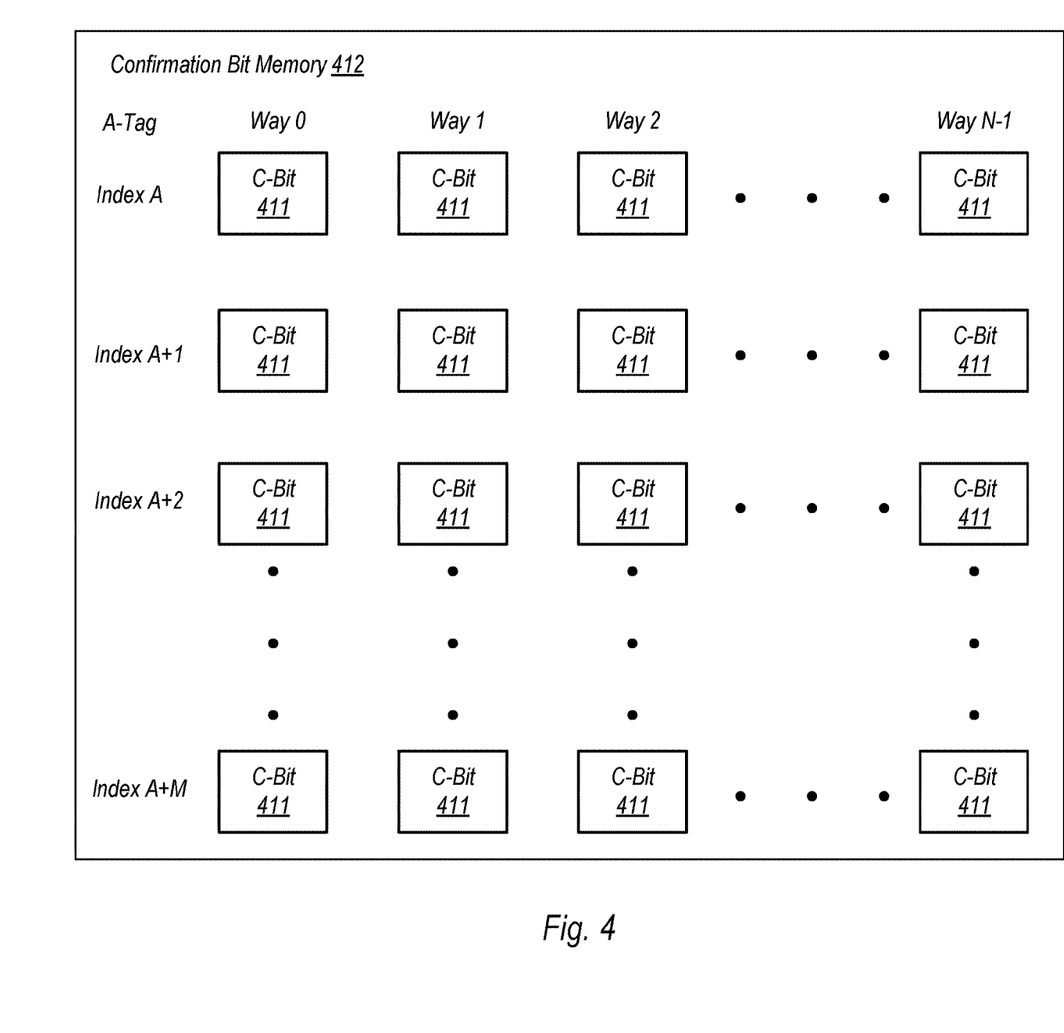
FIG. 4 is a block diagram of one embodiment of a confirmation bit memory.

Confirmation Bit Memory Example:

FIG. 4 is a block diagram of one embodiment of a confirmation bit memory used to store confirmation bits corresponding to correct predictions in accordance with this disclosure. In the embodiment shown, confirmation bit memory 412 is arranged to store a number of confirmation bits 411. A confirmation bit, when set (e.g., having a value of logic 1) in the embodiment shown indicates that a way storing a requested cache line has been previously predicted as correct and that the prediction is still valid. A prediction may remain valid as long as the corresponding cache line remains validly stored in the cache. A confirmation bit may be placed in a reset state (e.g., to a value of logic 0) if a corresponding cache line has been invalidated, evicted, and so on as described above, as well as in situations where no correct prediction has been made for the corresponding way and index. Upon repopulating the cache after a context switch, the various confirmation bits may remain in a reset state until cache lines stored therein are correctly predicted.

Confirmation bit memory 412 in the illustrated embodiment is arranged by way and index, with the index being associated with various address tags. Thus, if a cache line associated with an address tag corresponding to Index A is correctly predicted to be stored in, e.g., Way 2, the confirmation bit 411 at the intersection of the Index A row and Way 2 column may be set. For subsequent requests for that particular cache line, a read by a cache controller of that confirmation bit may cause the verification of a prediction process (e.g., cache tag read and compare operations as described above) to be eliminated.

Figure 5:
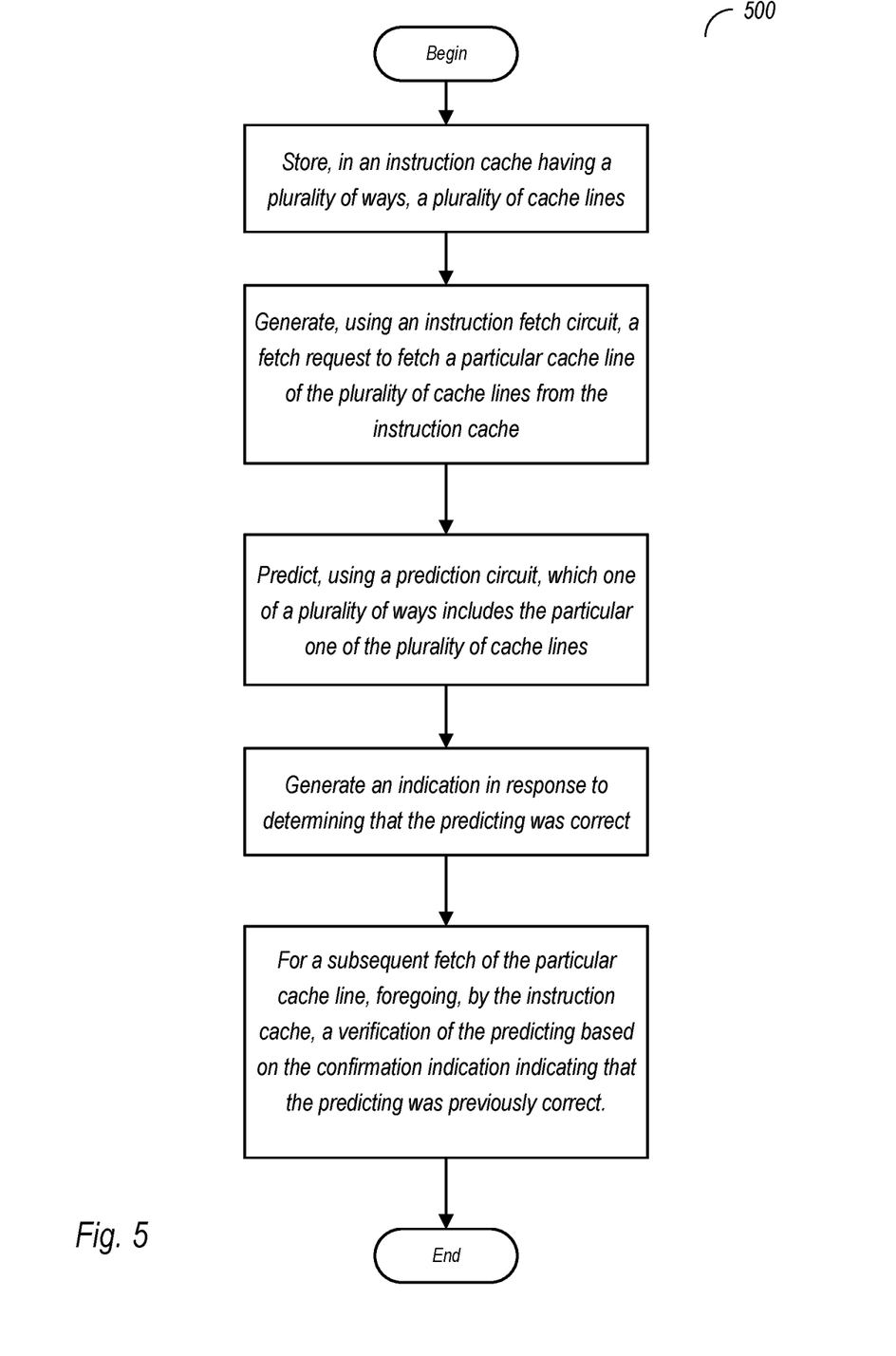
FIG. 5 is a flow diagram illustrating one embodiment of a method for operating a cache subsystem.

Methods for Operating a Cache Subsystem:

FIG. 5 is a flow diagram of one embodiment of a method for operating a cache subsystem. As disclosed herein, Method 500 may be carried out by any of the various hardware embodiments discussed above. Hardware embodiments not discussed herein but otherwise capable of carrying out Method 500 are also considered to fall within the scope of this disclosure.

Method 500 includes storing cache lines in a plurality of ways of a cache (block 505). The method further includes generating, using a requestor circuit, a request to access a particular cache line in the cache (block 510), and thereafter, generating, using a prediction circuit, a prediction of which one of the plurality of ways of the cache includes the particular cache line (block 515). Upon generating the prediction, the method continues with verifying the prediction using a comparison circuit, wherein the verifying comprises comparing a particular address tag associated with the particular cache line with a cache tag corresponding to a predicted one of the plurality of ways (block 520). The method also includes storing, using the prediction circuit, a confirmation bit in response to the comparing indicating the prediction was correct (block 525) and foregoing, for a subsequent access request of the particular cache line and based on the confirmation bit indicating the prediction was correct, verification of a subsequent prediction that the particular cache line is included in the one of the plurality of ways (block 530).

In various embodiments, foregoing the verification of a subsequent request includes foregoing a read of the cache tag from the cache and foregoing the comparing of the particular address tag and the cache tag. By forgoing these two operations, power savings and performance improvements maybe realized.

Various embodiments of method 500 includes storing a plurality of address tags, including the particular address tag, in a tag memory, wherein ones of the plurality of address tags correspond to entries stored in the cache. For such embodiments, determining the prediction was correct is based on the particular address tag matching the cache tag. After confirming a prediction to be correct, the method includes storing the confirmation bit in a confirmation bit memory. For requests to access a cache line, embodiments of the method include querying the confirmation bit memory in response to a subsequent prediction of the particular cache line in order to determine if a previous prediction was correct.

From time to time, correctly predicted cache lines may be evicted from the cache. Accordingly, embodiments of Method 500 include resetting a particular confirmation bit stored in the confirmation bit memory in response to a cache line corresponding to the particular confirmation bit being evicted from the cache. Other conditions can cause a reset of a confirmation bit as well. For example, embodiments of Method 500 may include resetting a particular confirmation bit stored in the confirmation bit memory in response to invalidation of an address translation associated with a cache line corresponding to the particular confirmation bit.

Figure 6:
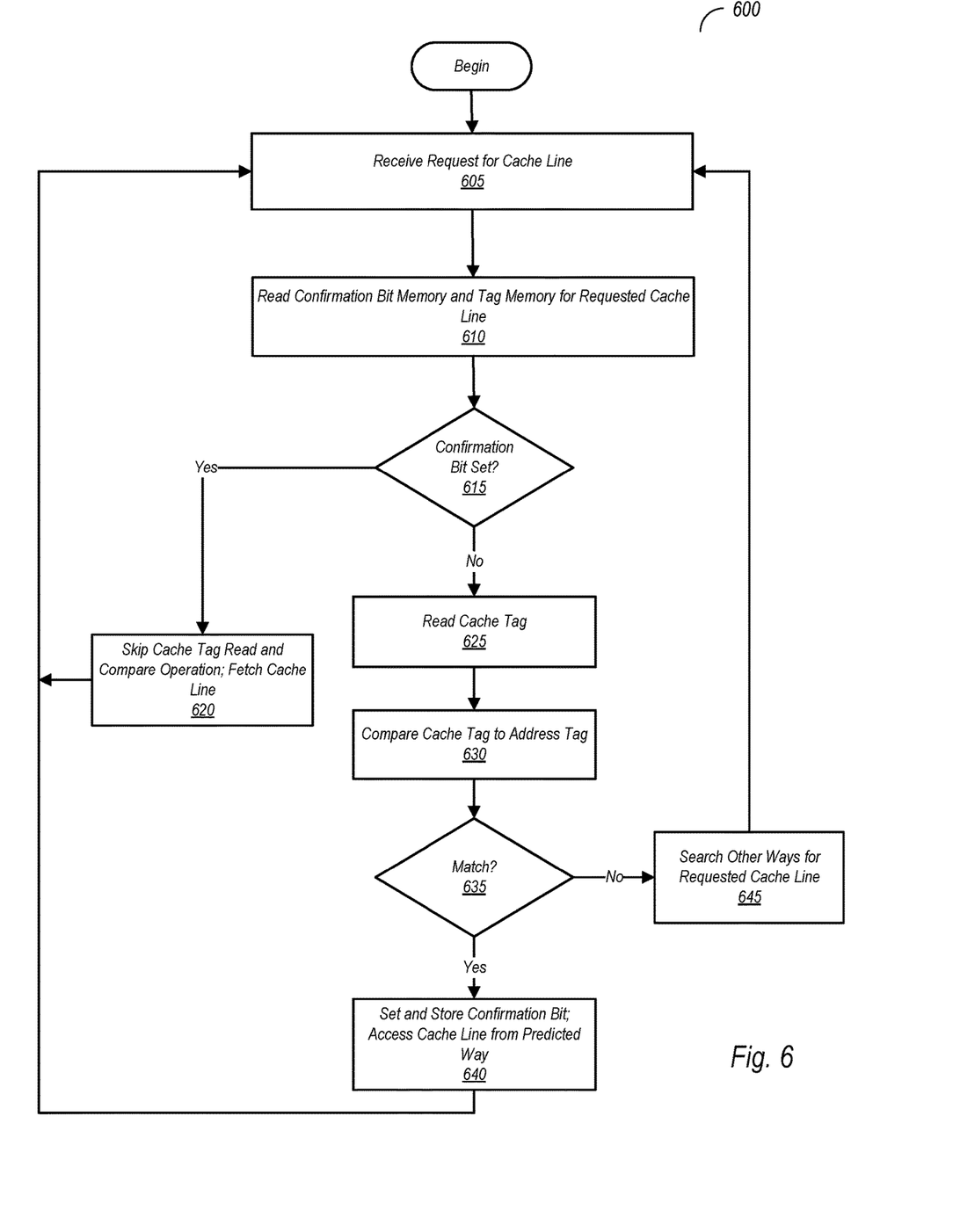
FIG. 6 is a flow diagram illustrating one embodiment of a method for operating a cache subsystem.

FIG. 6 is a block diagram of another embodiment of a method for operating a cache subsystem. As with Method 500 discussed above, Method 600 may be carried out by ones of the various hardware embodiments and components described in reference to FIGS. 1-4. Embodiments of a cache subsystem capable of carrying out Method 600 but not otherwise disclosed herein are also considered to fall within the scope of this disclosure.

Method 600 includes a cache subsystem receiving a request for a cache line (block 605). Thereafter, the method includes reading a confirmation bit memory, as well as a tag memory for the requested cache line (block 610). The tag memory in various embodiments includes address tags, and thus the address tag corresponding to the requested cache line may be retrieved from the tag memory. Meanwhile, the confirmation bit memory may be read to determine if a prior prediction that a particular way is storing the requested cache line was correct. If it is determined that the corresponding confirmation bit is set (block 615, yes), indicating a prior correct prediction of the particular way storing the requested cache line, the method continues with skipping the cache tag read and compare operations, while the requested cache line is fetched from the cache (block 620). Thereafter, Method 600 returns to block 605 and waits for the next cache line request.

If the confirmation bit is not set (block 615, no), then a cache tag corresponding to the predicted way is read (block 625). A comparison operation is then performed, comparing the cache tag to an address tag corresponding to the requested cache line (block 630). If the address tag matches the cache tag (block 635, yes), the prediction is correct, and the method continues with the setting and storing of the confirmation bit while accessing the cache line from the predicted way (block 640). Thereafter, Method 600 returns to block 605 to wait for the next cache request.

If, on the other hand, the address tag and the cache tag do not match (block 635, no), then a search for the requested cache line is conducted in other ways of the cache (block 645), with the requested line being provided if it is present in the cache. Method 600 then returns to block 605.

Figure 7:
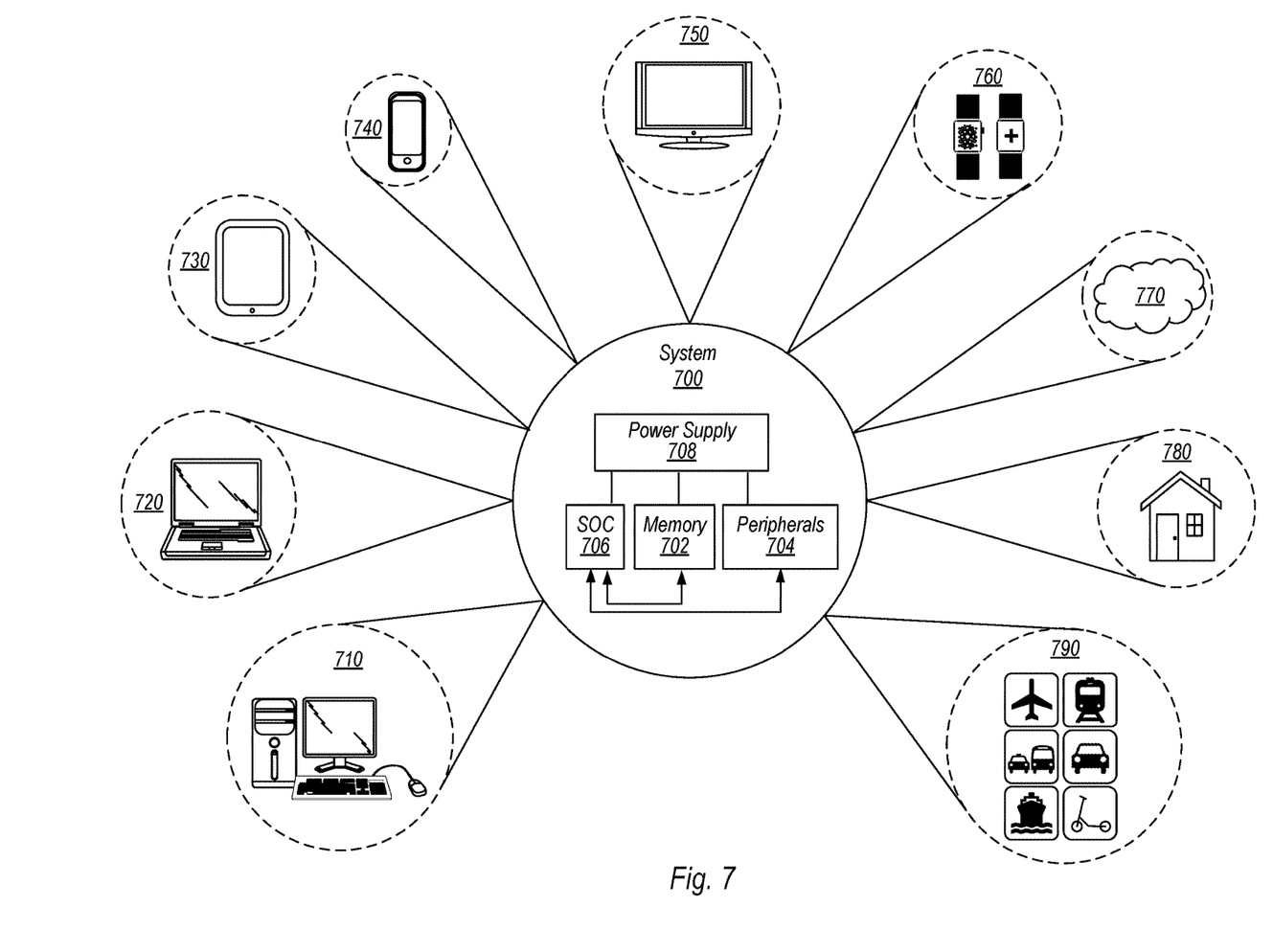
FIG. 7 is a block diagram of one embodiment of an example system.

Example System:

Turning next to FIG. 7, a block diagram of one embodiment of a system 700 is shown that may incorporate and/or otherwise utilize the methods and mechanisms described herein. In the illustrated embodiment, the system 700 includes at least one instance of a system on chip (SoC) 706 which may include multiple types of processing units, such as a central processing unit (CPU), a graphics processing unit (GPU), or otherwise, a communication fabric, and interfaces to memories and input/output devices. In some embodiments, one or more processors in SoC 706 includes multiple execution lanes and an instruction issue queue. In various embodiments, SoC 706 is coupled to external memory 702, peripherals 704, and power supply 708.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer, or other device). In some embodiments, more than one instance of SoC 706 is included (and more than one external memory 702 is included as well).

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

SoC 706 in the embodiment shown may include various levels of cache memory, some of which may be shared among various components, while others may be dedicated caches. Such cache memories may be implemented as a part of corresponding cache subsystems. At least some of the cache subsystems on SoC 706 may operate in accordance with the various hardware and method embodiments discussed above in reference to FIGS. 1-6. Accordingly, at least some the various cache subsystems on SoC 706 may be arranged to predict a way that is storing a requested cache line, and further configured to generate and store an indication when a prediction is correct. For subsequent requests for access to a currently valid cache line, such cache subsystems may use the indication as a confirmation that the cache line is stored in a predicted way, and thereby eliminate a verification operation (e.g., the tag read and compare operations discussed above, although other mechanisms for verification are possible and contemplated). Eliminating the verification operation may reduce power consumption, and may additionally improve performance of the cache subsystem.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch 760 may include a variety of general-purpose computing related functions. For example, smartwatch 760 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 7 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
    a prediction circuit configured to, in response to a cache access request, generate a prediction of a particular one of a plurality of ways in a cache memory includes a particular cache line associated with the cache access request;
    a comparison circuit configured to determine if the prediction is correct, wherein, to determine if the prediction is correct, the comparison circuit is configured to compare a first tag associated with the particular cache line and a second tag associated with the particular one of the plurality of ways; and
    a confirmation bit memory, wherein the prediction circuit is configured to, in response to the comparison circuit determining that the prediction was correct, set a confirmation bit in the confirmation bit memory;
    wherein, for a subsequent cache access request to the particular cache line, the comparison circuit is configured to, in response to determining that the confirmation bit is set in the confirmation bit memory, forego performing a comparison of the first tag and the second tag.

2. The apparatus of claim 1, further comprising a tag array circuit configured to store address tags corresponding to the plurality of ways of the cache memory, wherein, in forgoing performing the comparison, the comparison is configured to forego accessing the tag array circuit to obtain the second tag.

3. The apparatus of claim 1, wherein, in foregoing performing the comparison, the comparison circuit is configured to forego accessing the cache memory to obtain the first tag.

4. The apparatus of claim 1, wherein the comparison circuit is configured to determine that the prediction is correct if the first tag matches the second tag.

5. The apparatus of claim 1, wherein the confirmation bit memory is configured to store a plurality of confirmation bits corresponding to correct predictions generated by the prediction circuit.

6. The apparatus of claim 1, further comprising a cache controller coupled to the cache and the prediction circuit, wherein the cache controller is configured to determine if the confirmation bit is set in response to the subsequent cache access request that the particular cache line is stored in the particular one of the plurality of ways.

7. The apparatus of claim 6, wherein the cache controller is configured to reset the confirmation bit in response to evicting the particular cache line from the cache memory.

8. The apparatus of claim 6, wherein the cache controller is configured to reset the confirmation bit in response to a determination that an address translation associated with the particular cache line is invalid.

9. The apparatus of claim 6, wherein the cache controller is configured to, in response to determining that the confirmation bit is set, provide the particular cache line to a requestor.

10. The apparatus of claim 6, wherein the cache controller is configured to, in response to determining that the confirmation bit is set, generate a signal to cause the comparison circuit to forego the comparison.

11. A method comprising:
    generating, using a prediction circuit and in response to a cache access request, a prediction of a particular one of a plurality of ways in a cache memory includes a particular cache line associated with the cache access request;
    determining, using a comparison circuit, if the prediction is correct, wherein the determining comprises comparing a first tag associated with the particular cache line and a second tag associated with the particular one of the plurality of ways;
    setting, in a confirmation bit memory and in response to determining that the prediction was correct, a confirmation bit; and
    foregoing determining if the prediction was correct for a subsequent cache access request to the particular cache line in response to determining that the confirmation bit is set in the confirmation bit memory.

12. The method of claim 11, wherein foregoing determining if the prediction was correct comprises:
    foregoing reading of the first tag from the cache memory, wherein the first tag is a cache tag associated with the one of the plurality of ways; and
    foregoing reading of the second tag from a tag array circuit, wherein the second tag is an address tag associated with the particular cache line.

13. The method of claim 11, wherein foregoing determining if the prediction was correct comprises determining, using a cache controller, if the confirmation bit is set in response to the subsequent cache access request that the particular cache line is stored in the particular one of the plurality of ways.

14. The method of claim 11, further comprising determining the prediction was correct in response to the first tag matching the second tag.

15. The method of claim 11, further comprising resetting the confirmation bit, using a cache controller, in response to an eviction of the particular cache line from the cache.

16. The method of claim 11, further comprising resetting the confirmation bit, using a cache controller, in response to a determination that an address translation associated with the particular cache line is invalid.

17. The method of claim 11, further comprising providing, using a cache controller, the particular cache line to a requestor that initiated the cache access request.

18. A system comprising:
  a requestor circuit configured to initiate a cache access request; and
  a cache subsystem, wherein the cache subsystem includes:
    a cache controller configured to receive the cache access request;
    a prediction circuit configured to, in response to a cache access request, generate a prediction of a particular one of a plurality of ways in a cache memory includes a particular cache line associated with the cache access request;
    a comparison circuit configured to determine if the prediction is correct, wherein, to determine if the prediction is correct, the comparison circuit is configured to compare a first tag associated with the particular cache line and a second tag associated with the particular one of the plurality of ways; and
    a confirmation bit memory, wherein the prediction circuit is configured to, in response to the comparison circuit determining that the prediction was correct, set a confirmation bit in the confirmation bit memory;
    wherein the cache controller is configured to, for a subsequent cache access request for the particular cache line, inhibit the comparison circuit from determining if the prediction is correct in response to determining that the confirmation bit is set in the confirmation bit memory.

19. The system of claim 18, wherein, to inhibit the comparison circuit from determining if the prediction is correct for a subsequent cache access request to the particular cache line, the cache controller is configured to:
  cause the comparison circuit to forego reading of the first tag from the cache memory, wherein the first tag is a cache tag associated with the one of the plurality of ways; and
  cause the comparison circuit to forego reading of the second tag from a tag array circuit, wherein the second tag is an address tag associated with the particular cache line.

20. The system of claim 18, wherein the comparison circuit is configured to determine that the prediction was correct in response to determining that the first tag matches the second tag.

* * * * *